No. 700,016.  
Patented May 13, 1902.
C. G. CARLSAN & A. TUNALL.
MECHANISM FOR SECURING LAGS TO CARRIER CHAINS.
(Application filed Dec. 26, 1901.)
(No Model.)
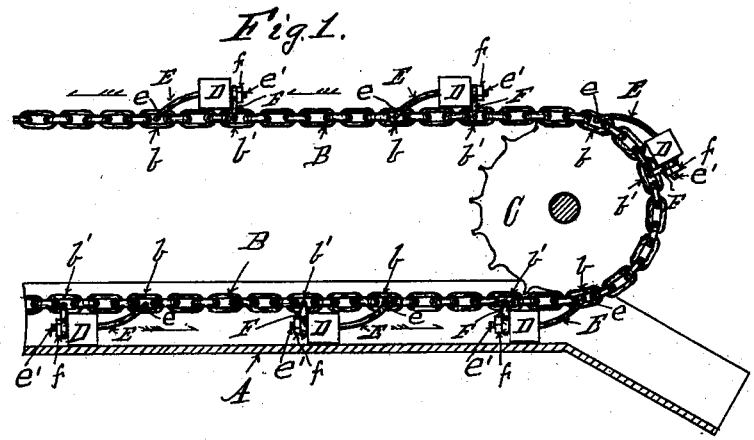
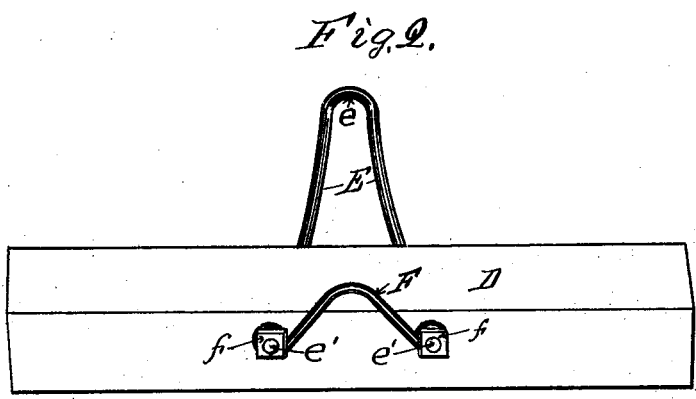
Witnesses.  
Inventors.  
Carl G. Carlsan.  
Adolph Tunall.  
By Atty.

UNITED STATES PATENT OFFICE.

CARL G. CARLSAN AND ADOLPH TUNALL, OF DUBOIS, PENNSYLVANIA.

MECHANISM FOR SECURING LAGS TO CARRIER-CHAINS.

SPECIFICATION forming part of Letters Patent No. 700,016, dated May 13, 1902.

Application filed December 26, 1901. Serial No. 87,367. (No model.)

*To all whom it may concern:*

Be it known that we, CARL G. CARLSAN and ADOLPH TUNALL, citizens of the United States, residing at Dubois, in the county of Clearfield and State of Pennsylvania, have invented certain new and useful Improvements in Mechanism for Securing Lags to Carrier-Chains; and we do hereby declare the following to be a full, clear, and exact description of the invention, such as will enable others skilled in the art to which it appertains to make and use the same, reference being had to the accompanying drawings, and to the letters of reference marked thereon, forming part of this specification.

Our invention relates to improvements in mechanism for securing lags to carrier-chains, and has for its object the securing of the lags to the carrier-chain in such a manner that the lags are at all times during their traverse through the carrier-trough held firmly in a horizontal position and also at right angles to the carrier-chain to which they are secured. We accomplish these results by means of the mechanism hereinafter set forth and described, and illustrated in the accompanying drawings, in which—

Figure 1 is a side view, partly in elevation and partly in section, embodying our invention. Fig. 2 is a perspective view of a lag with our improved mechanism thereon.

In the drawings thus illustrating our invention, A represents a section of a carrier-trough, B the carrier-chain, and C one of the sprocket-wheels driving the chain B, these parts being of the usual construction.

To the carrier-chain B lags D are attached in the following manner: We place elongated loops or stirrups E, having their closed ends $e$ curved upward and extended through the links $b$ of the chain in front of the lags D and pass the rear ends $e'\ e'$ thereof through suitable holes in the lags D, and through the links $b'$ of the chain at the rear sides of the lags D we place curved cross-bars F, having openings in the ends thereof adapted to pass over the ends $e'\ e'$ of the curved loops or stirrups E, to which they are secured by means of nuts $f\ f$.

In operation it will be observed that the travel of the lags being as indicated by the arrows in Fig. 1 the loops or stirrups extend from the lags D through links $b$ of the chain, forming an efficient means for moving them forward, while the curved cross-bars F, extending from the rear sides of said lags through links $b'$ of the chain, operate in conjunction with the loops or stirrups E not only to retain the lags D in a horizontal position, but to retain them at right angles with the carrier-chain B, so that the lags D will operate in the carrier-trough A in the most efficient manner.

Having thus shown and described our invention, so as to enable others to construct and use the same, what we claim as new, and desire to secure by Letters Patent of the United States, is—

1. The combination in a mechanism for securing lags to a carrier-chain, of a curved loop or stirrup, and a curved cross-bar secured to the rear end thereof, substantially as set forth.

2. The combination with a carrier-chain, of lags, loops or stirrups extending from the fronts of said lags through links of the carrier-chain, and curved cross-bars extending upward from the backs of said lags through links of said chain substantially as set forth.

In testimony whereof we affix our signatures in presence of two witnesses.

CARL G. CARLSAN.
     ADOLPH TUNALL.

Witnesses:
 J. C. WHITE,
 H. J. MILLIREN.